US011783597B2

(12) United States Patent
Ip et al.

(10) Patent No.: US 11,783,597 B2
(45) Date of Patent: Oct. 10, 2023

(54) IMAGE SEMANTIC SEGMENTATION FOR PARKING SPACE DETECTION

(71) Applicant: Continental Autonomous Mobility US, LLC, Auburn Hills, MI (US)

(72) Inventors: Julien Ip, Royal Oak, MI (US); Eduardo Jose Ramirez Llanos, Auburn Hills, MI (US); Xin Yu, Rochester Hills, MI (US); Dhiren Verma, Farmington Hills, MI (US); Andrew Bolduc, Auburn Hills, MI (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 171 days.

(21) Appl. No.: 17/138,423

(22) Filed: Dec. 30, 2020

(65) Prior Publication Data

US 2022/0207277 A1 Jun. 30, 2022

(51) Int. Cl.
*G06V 20/58* (2022.01)
*G06V 10/44* (2022.01)
*G06V 10/22* (2022.01)
*G01S 13/931* (2020.01)

(52) U.S. Cl.
CPC .......... *G06V 20/586* (2022.01); *G01S 13/931* (2013.01); *G06V 10/22* (2022.01); *G06V 10/44* (2022.01); *G01S 2013/9314* (2013.01)

(58) Field of Classification Search
CPC ...... G06V 20/586; G06V 10/22; G06V 10/44; G06V 10/82; G01S 13/931; G01S 2013/9314
See application file for complete search history.

(56) References Cited

U.S. PATENT DOCUMENTS

| | | | |
|---|---|---|---|
| 6,970,101 B1 | 11/2005 | Squire et al. | |
| 7,053,795 B2 | 5/2006 | Maemura et al. | |
| 7,899,583 B2 | 3/2011 | Mendelson | |
| 8,923,565 B1 * | 12/2014 | Zhang | G08G 1/147 |
| | | | 382/104 |
| 9,557,741 B1 * | 1/2017 | Elie | G01B 11/22 |

(Continued)

FOREIGN PATENT DOCUMENTS

| | | | |
|---|---|---|---|
| CN | 109186586 A | | 1/2019 |
| CN | 110335492 A | * | 10/2019 |

(Continued)

OTHER PUBLICATIONS

Translation of DE102013018721 (Year: 2014).*
Translation of CN110335492 (Year: 2019).*
Translation of JP2001322520 (Year: 2001).*
Translation of WO2020082777 (Year: 2020).*

(Continued)

*Primary Examiner* — Carol Wang

(57) ABSTRACT

An automated vehicle parking system for a motor vehicle is disclosed and includes at least one camera obtaining images proximate a vehicle, at least one sensor array detecting objects proximate the vehicle, and a controller configured to generate a mask of an area proximate the vehicle from the images obtained by the at least one camera including labeled features identified within the obtained images and project the generated mask onto an occupancy grid generated with information from the at least one sensor array, wherein the controller is configured to locate a parking space responsive to open spaces defined within the generated mask.

18 Claims, 5 Drawing Sheets

(56) References Cited

U.S. PATENT DOCUMENTS

| | | | |
|---|---|---|---|
| 10,078,789 B2 | 9/2018 | Gupta et al. | |
| 10,867,192 B1 | 12/2020 | Song et al. | |
| 2010/0156671 A1* | 6/2010 | Lee | G08G 1/168 340/932.2 |
| 2014/0368636 A1* | 12/2014 | Lee | B62D 15/0285 348/118 |
| 2015/0344028 A1 | 12/2015 | Gieseke et al. | |
| 2017/0197615 A1* | 7/2017 | Elie | B60W 30/06 |
| 2018/0095474 A1* | 4/2018 | Batur | G01S 13/867 |
| 2018/0099661 A1 | 4/2018 | Bae et al. | |
| 2018/0232583 A1 | 8/2018 | Wang et al. | |
| 2020/0104613 A1* | 4/2020 | Hirai | G06V 20/586 |
| 2021/0276543 A1* | 9/2021 | Wang | G06V 20/58 |

FOREIGN PATENT DOCUMENTS

| | | | | |
|---|---|---|---|---|
| DE | 102013018721 A1 * | 6/2014 | | G08G 1/143 |
| EP | 3454252 A1 | 3/2019 | | |
| GB | 2481324 B | 12/2011 | | |
| JP | 2001322520 A * | 11/2001 | | B60R 1/00 |
| KR | 101715014 B1 | 3/2017 | | |
| KR | 101790426 B1 | 10/2017 | | |
| WO | WO-2020082777 A1 * | 4/2020 | | B60W 30/06 |

OTHER PUBLICATIONS

Tătulea, Paula, Florina Călin, Remus Brad, Lucian Brâncovean, and Mircea Greavu. "An image feature-based method for parking lot occupancy." Future Internet 11, No. 8 (2019): 169. (Year: 2019).*

Delibaltov, Diana, Wencheng Wu, Robert P. Loce, and Edgar A. Bernal. "Parking lot occupancy determination from lamp-post camera images." In 16th International IEEE Conference on Intelligent Transportation Systems (ITSC2013), pp. 2387-2392. IEEE, 2013. (Year: 2013).*

Zhang, Peizhi, Lu Xiong, Zhuoping Yu, Peiyuan Fang, Senwei Yan, Jie Yao, and Yi Zhou. "Reinforcement learning-based end-to-end parking for automatic parking system." Sensors 19, No. 18 (2019): 3996. (Year: 2019).*

Suhr, Jae Kyu et al: "Sensor Fusion-Based Vacant Parking Slot Detection and Tracking", IEEE Transactions on Intelligent Transportation Systems, IEEE, vol. 15, No. 1, Feb. 2014 (Feb. 1, 2014), pp. 21-36, XP011538711.

Jiang, Shaokang et al: "Detection of Parking Slots Based on Mask R-CNN", Applied Sciences, vol. 10, No. 12, Jun. 23, 2020 (Jun. 23, 2020), p. 4295, XP055907389.

The International Search Report and the Written Opinion of the International Searching Authority dated Apr. 8, 2022 for the counterpart PCT Application No. PCT/US2021/073097.

* cited by examiner

IMAGE SEMANTIC SEGMENTATION FOR PARKING SPACE DETECTION

TECHNICAL FIELD

The present disclosure relates to an autonomous driving system and more particularly to a system for detecting suitable parking spaces.

BACKGROUND

Autonomously operated vehicles utilize information gathered from various different sensor and communication devices. Such devices include GPS, radar, lidar and cameras along with sensors that measure vehicle operation. Parking of a vehicle requires differentiation of parking spaces from other open spaces. Sensing of empty spaces within an image of an environment proximate a vehicle is a challenging task for an autonomously operated vehicle.

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An automated vehicle parking system for a motor vehicle according to an exemplary embodiment of this disclosure includes, among other possible things, at least one camera obtaining images proximate a vehicle, at least one sensor array detecting objects proximate the vehicle, and a controller configured to generate a mask of an area proximate the vehicle from the images obtained by the at least one camera including labeled features identified within the obtained images and project the generated mask onto an occupancy grid generated with information from the at least one sensor array, wherein the controller is configured to locate a parking space responsive to open spaces defined within the generated mask.

In another example embodiment of the forgoing automated vehicle parking system, the controller includes a neural network configured to label features within the obtained images and is further configured to detect edges of objects in the generated mask to define parking space size.

In another example embodiment of any of the foregoing automated vehicle parking systems, the detection of edges is comprises detecting horizontal edges of a parked vehicle within a parking space and horizontal edges of parking space markers.

In another example embodiment of any of the foregoing automated vehicle parking systems, the controller is configured to define a best line across the defined parking spaces based on the detected horizontal edges of the parked vehicle and the horizontal edges of the parking spaces.

In another example embodiment of any of the foregoing automated vehicle parking systems, the controller is further configured to determine that a parking space is free in response to detecting free spaces on a side of the best line opposite the vehicle.

In another example embodiment of any of the foregoing automated vehicle parking systems, the controller if further configured to associate a probability that a parking space is empty and to select the parking space with a predefined probability for parking of the vehicle.

In another example embodiment of any of the foregoing automated vehicle parking systems, the controller is further configured to determine a size of the parking space after the mask is projected onto the occupancy grid using dimensions determined from the occupancy grid.

In another example embodiment of any of the foregoing automated vehicle parking systems, the controller is further configured to select a center of the parking spot that is utilized as a destination point for a path determined for maneuvering the vehicle into the parking space.

In another example embodiment of any of the foregoing automated vehicle parking systems, the controller is configured to define the parking space based on a selection by a vehicle operator in response to no visible parking markers being within the generated mask.

A method of detecting a parking space for an autonomously operated vehicle according to another example embodiment of this disclosure includes, among other possible things, obtaining images of an area proximate a vehicle, generating a mask of the area proximate the vehicle that includes labeled features identified within the obtained images, defining free space within the generated mask as parking spaces for the vehicle, and projecting the generated mask onto an occupancy grid of the area proximate the vehicle to locate the parking space relative to the vehicle.

In another embodiment of the foregoing method of detecting a parking space, detecting edges of objects in the generated mask to define parking spot size.

In another embodiment of any of the foregoing methods of detecting a parking space, detecting of edges of objects comprises detecting horizontal edges of a parked vehicle within a parking spot and horizontal edges of parking space markers.

Another embodiment of any of the foregoing methods of detecting a parking space comprises defining a best line across the defined parking spaces based on the detected horizontal edges of the parked vehicle and the horizontal edges of the parking spaces.

Another embodiment of any of the foregoing methods of detecting a parking space comprises determining that a parking space is free in response to detecting free spaces on a side of the best line opposite the vehicle.

Another embodiment of any of the foregoing methods of detecting a parking space comprises associating a probability that a parking space is empty and selecting the parking space with a predefined probability for parking of the vehicle.

Another embodiment of any of the foregoing methods of detecting a parking space further comprising determining a size of the parking space after the mask is projected onto the occupancy grid using dimensions determined from the occupancy grid.

Another embodiment of any of the foregoing methods of detecting a parking space comprising selecting a center of the parking spot for definition of a path for moving the vehicle into the parking spot.

In another embodiment of any of the foregoing methods of detecting a parking space, obtaining of images of an area proximate the vehicle further comprises obtaining images from cameras located on at least one side mirror of the vehicle.

In another embodiment of any of the foregoing methods of detecting a parking space defining free space within the obtained images further comprises selecting an open area as a parking space in response to no visible parking markers being within the generated mask.

In another embodiment of any of the foregoing methods of detecting a parking space, selecting an open area further comprises prompting a vehicle operator to assign a location within the open area as the parking space. Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
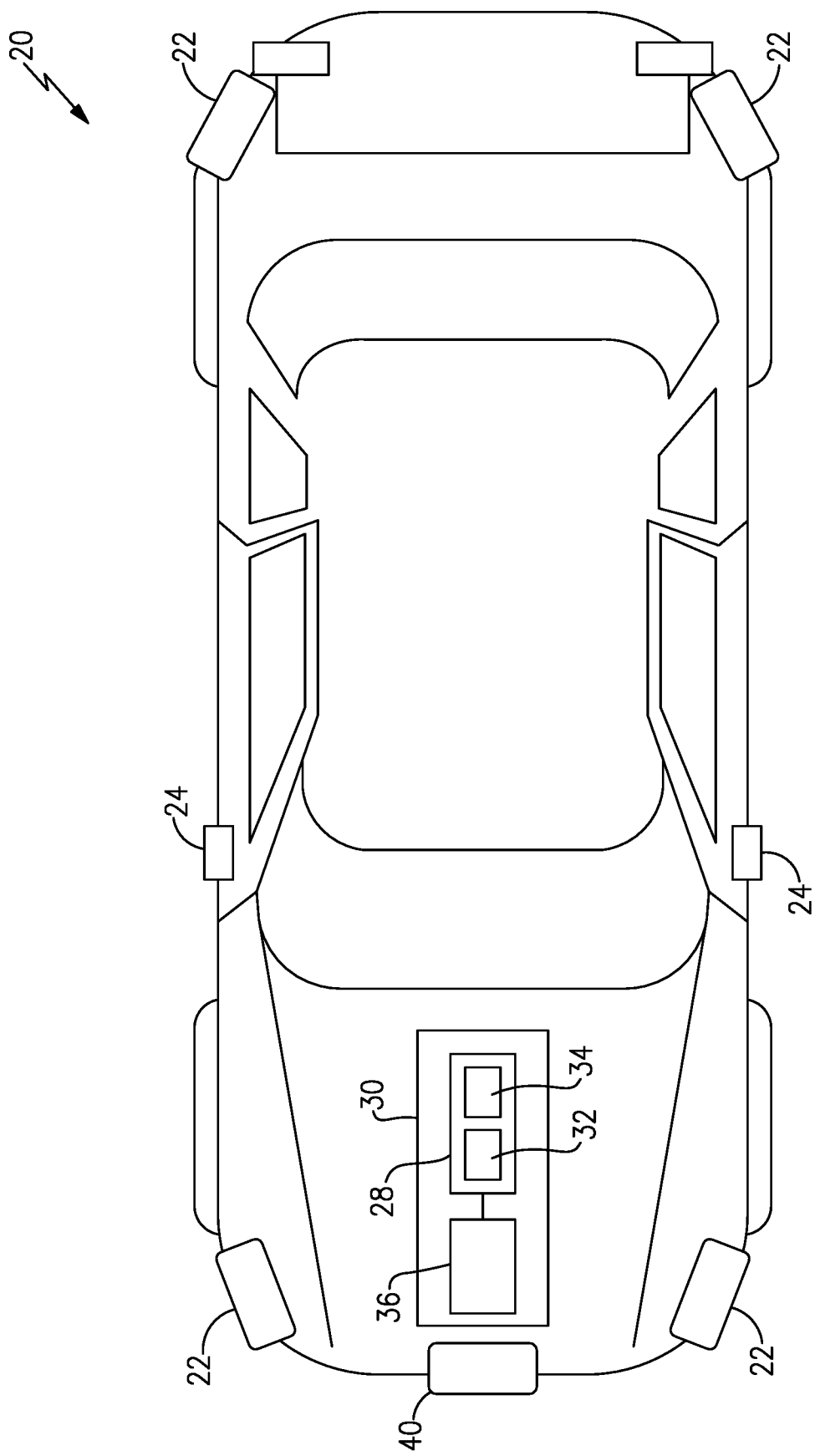
FIG. 1 is a schematic view of a vehicle including example parking space system of an automated driving system.

Referring to FIG. 1, a vehicle 20 is shown schematically that includes an example parking space detection system 28 that provides information utilized by an autonomous driving system 26. The parking space detection system 28 uses side cameras 24 and a front camera 40 to capture images proximate the vehicle 20. An artificial intelligence algorithm such as an example neural network 34 analyzes the images and applies labels to objects detected within the image. The labeled image is then projected onto an occupancy grid of objects detected proximate to the vehicle to identify open parking spaces. The occupancy grid may be generated with information from the cameras 24, 40 along with other sensor arrays on the vehicle such as radar devices 22. As appreciated, other sensor devices may be utilized within the contemplation of this disclosure.

The parking space detect system 28 and driving system 26 are part of a controller 30 configured to execute the disclosed method and algorithms. The example controller includes a processing device 32, a memory 36 and an artificial intelligence algorithm in the form of the neural network 34. Although a neural network 34 is disclosed by way of example, other image recognition systems and methods operating according to other artificial intelligence algorithms may be implemented within the contemplation of this disclosure.

The controller 30, processing device 32 and memory device 36 are schematically shown and may be part of an overall vehicle controller or a controller dedicated autonomous driving system 26. The controller 30 and the processing device 32 may be a hardware device for executing software, particularly software stored in the memory 36. The processing device 32 can be a custom made or commercially available processor, a central processing unit (CPU), an auxiliary processor among several processors associated with the computing device, a semiconductor based microprocessor (in the form of a microchip or chip set) or generally any device for executing software instructions.

The memory 36 can include any one or combination of volatile memory elements (e.g., random access memory (RAM, such as DRAM, SRAM, SDRAM, VRAM, etc.)) and/or nonvolatile memory elements. Moreover, the memory 36 may incorporate electronic, magnetic, optical, and/or other types of storage media. Note that the memory can also have a distributed architecture, where various components are situated remotely from one another, but can be accessed by the processor.

The software in the memory 36 may include one or more separate programs, each of which includes an ordered listing of executable instructions for implementing disclosed logical functions and operation. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

Input/Output devices (not shown) that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the parking detection system 28 is in operation, the processor 32 may be configured to execute software stored within the memory 36, to communicate data to and from the memory 36, and to generally control operations of the system 28 pursuant to the software. Software in memory, in whole or in part, is read by the processor, perhaps buffered within the processor, and then executed.

Figure 2:
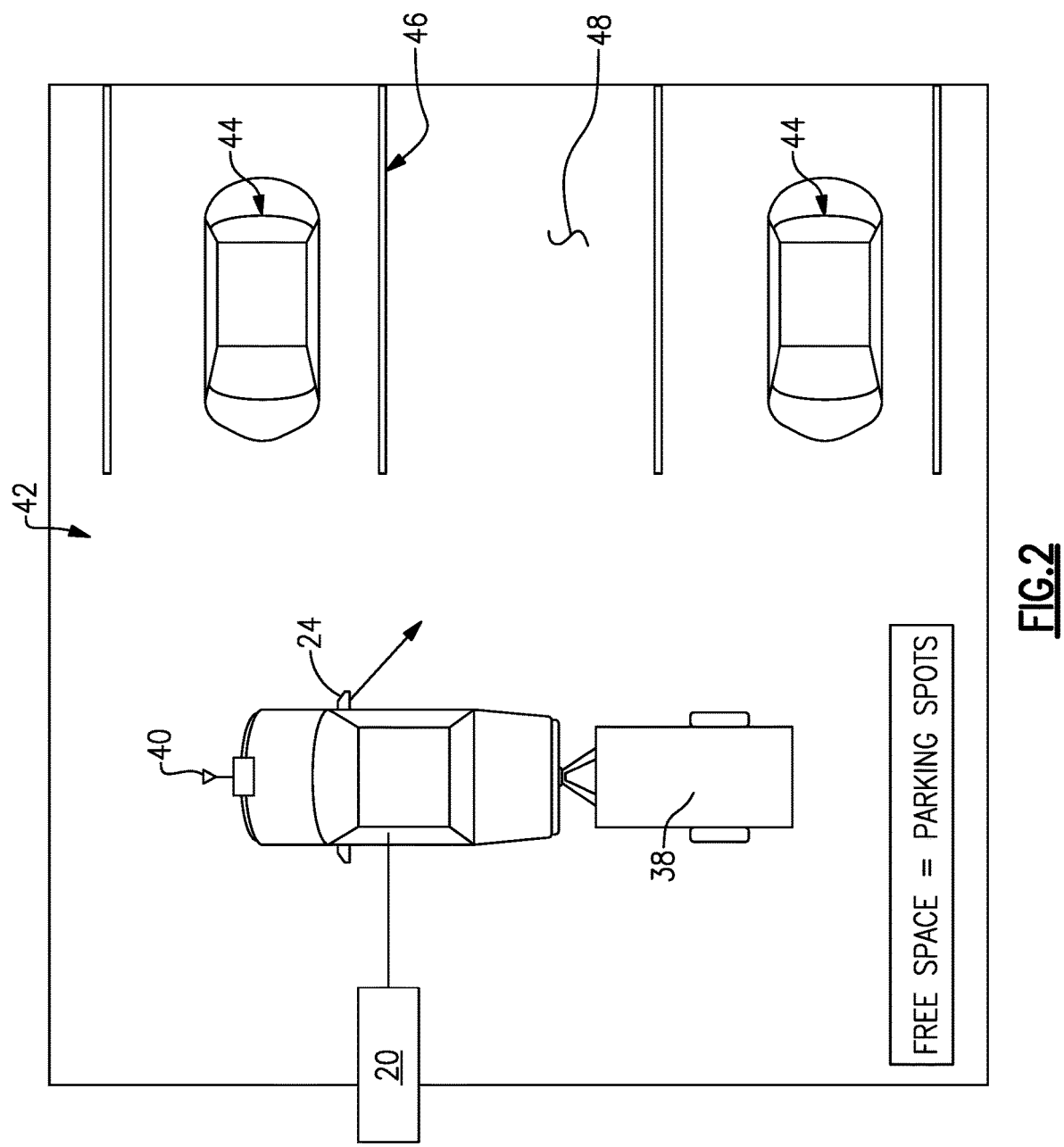
FIG. 2 is a schematic view of the example vehicle within a parking lot capturing images and labeling objects.

Referring to FIG. 2 with continued reference to FIG. 1, the controller 30 is configured to generate a mask of an area proximate the vehicle 20 from the images obtained by the cameras 24, 40. The controller 30 is further configured to assign labels to the features in the obtained images. The objects in the images are in this example, identified utilizing the neural network 34. As appreciated, other image recognition algorithms and systems could be utilized and are within the contemplation of this disclosure. The captured images are used to generate a mask that is later projected onto an occupancy grid.

FIG. 2 schematically illustrates the vehicle 20 within a parking lot 42 that includes other vehicles 44 parked within parking spaces and an open space 48. In this example, the open space 48 is disposed between parking markers 46. The view shown in FIG. 2 is a visual projection of the information obtained from the cameras 24, 40 into a bird's eye view. In this example, one of the side view mirrors 24 along with the front view camera 40 are utilized to capture images.

The captured images are utilized to create mask of the scene, in this case the parking lot with vehicles 44, spaces 48 and the markers 46. The image is labeled utilizing the neural network 34.

In this disclosed example, a trailer 38 is hitched to the vehicle 20. The presence of the trailer 38 is recognized by the controller 30 and the suitable parking area is evaluated based on the vehicle configuration to include the trailer 38.

The example system and method operates to detect suitable open spaces for parking of the vehicle based on the vehicle configuration, including the presence of a trailer as shown in this example.

Figure 3:
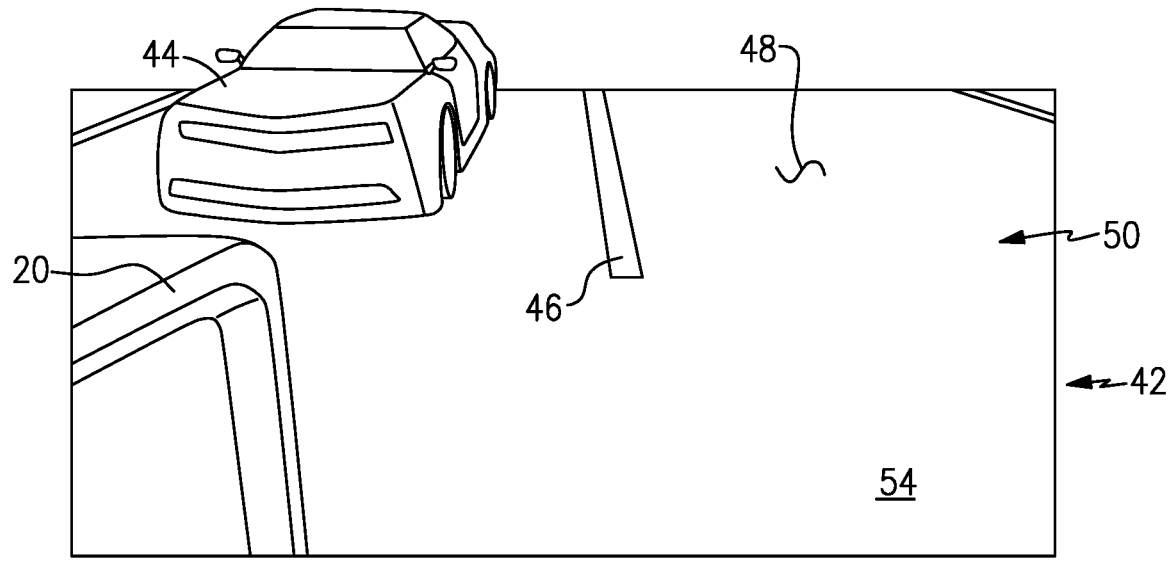
FIG. 3 is a schematic view of an example image with labeled objects.

Referring to FIG. 3, the images are utilized to generate a mask as schematically indicated at 50. The mask 50 includes labels for the vehicles 44, markers 46 and the spaces 48. The labeling of the objects within the mask 50 are first step in defining the mask 50 that will later be projected onto an occupancy grid.

Figure 4:
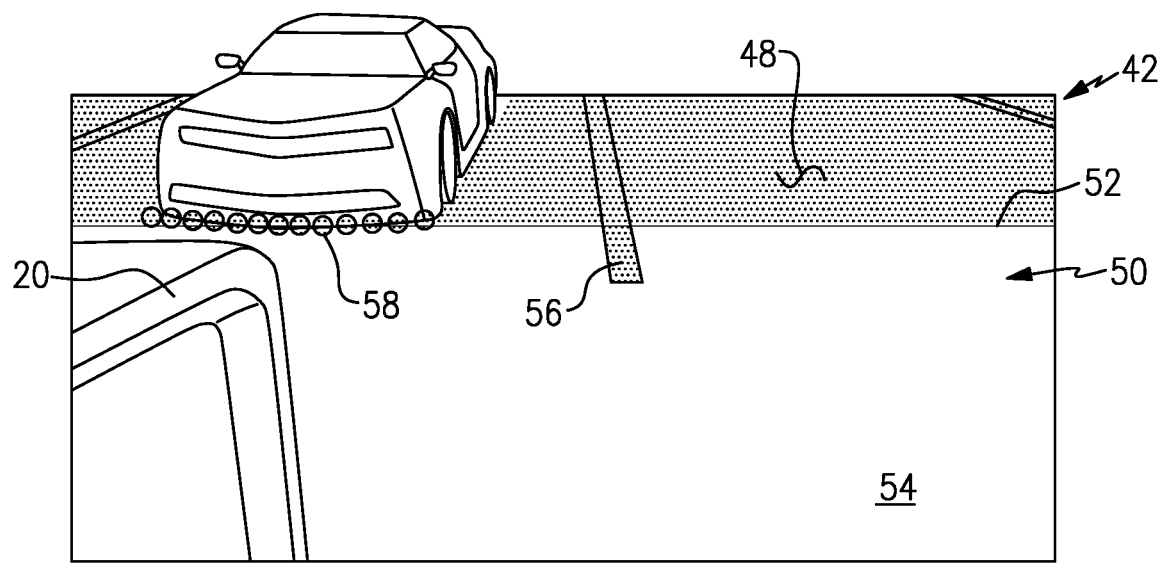
FIG. 4 is a schematic view of an example image with a best line identified.

Referring to FIG. 4, the mask 50 is further labeled by identifying features within the image to discern between empty spaces that are actually parking spaces and empty spaces that are not parking spaces. In this disclosed example, an edge of the vehicle 44 indicated at 58 is identified. A forward edge 56 of each marker 46 is also identified. The edges 58 and 56 are forward and closest to the vehicle 20 such that they provide an indication of what part of the open spaces are parking spaces and what parts are part of the pathway through the parking lot 42. In this example, the edges 58 and 56 provide points for the generation of a best line 52. The example best line 52 is a horizontal line created through the identified edges. As appreciated, other edges and line directions may be utilized to address other parking space orientations and configurations. The best line 52 is utilized in this example to differentiate open spaces that are parking spaces 48 and open spaces that is not a parking space as is indicated at 54. In this example, the controller 30 is configured to recognize open space 48 on a side of the best line 52 opposite the vehicle 20 as a parking space. Open spaces on the same side of the best line 52 are identified as not a parking space.

The best line 52 is also utilized to determine a size of the free space 48 such that the system can ascertain if the vehicle 20 will fit within the spot 48.

Figure 5:
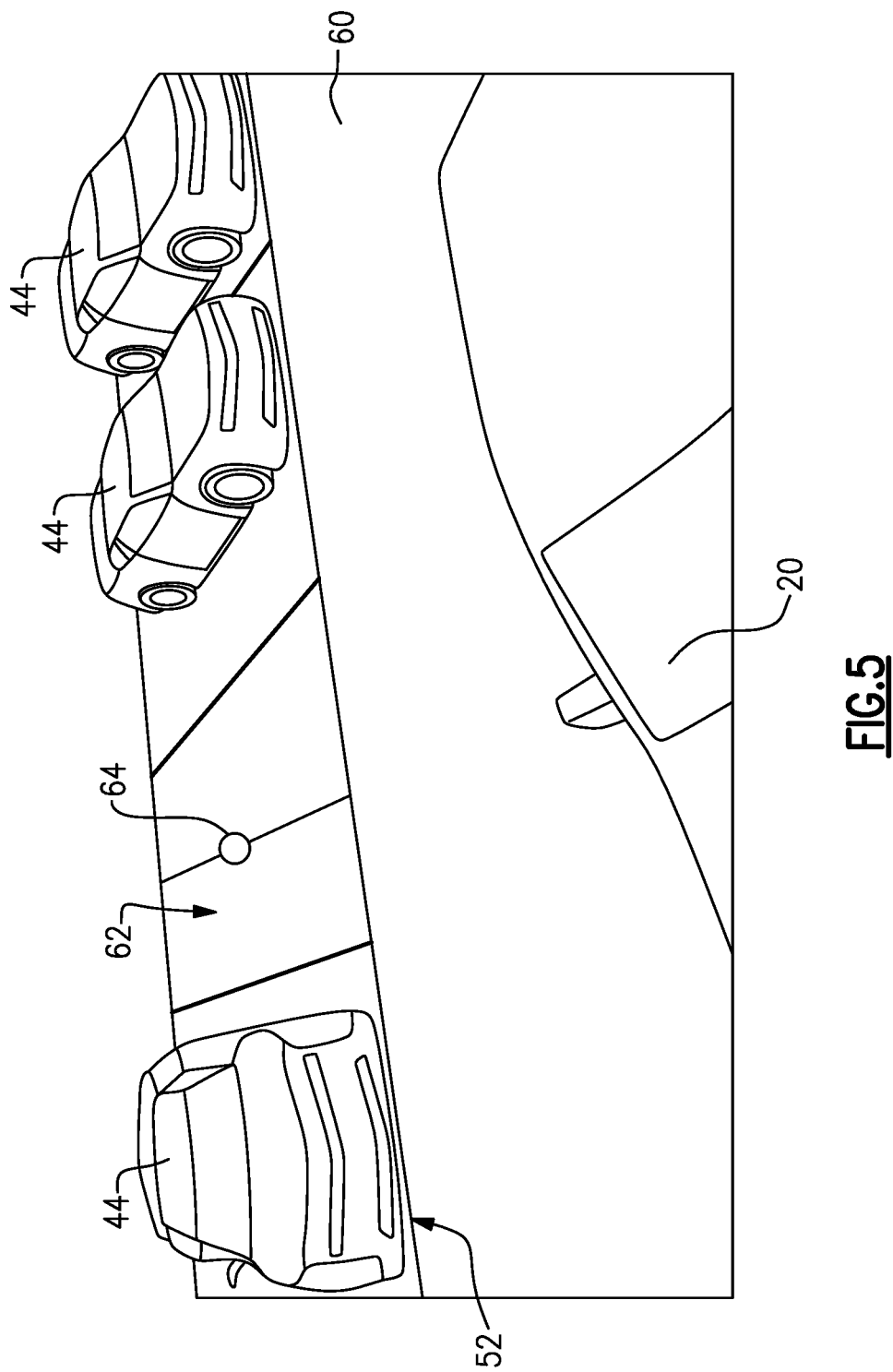
FIG. 5 is a schematic view of a mask applied to an occupancy gird and a n identified available parking space.

Referring to FIG. 5, the mask 50 is then projected onto an occupancy grid, schematically indicated at 60. Projecting the mask 50 onto the occupancy grid 60 places the open parking spaces as indicated at 62 to be located in the real world proximate the vehicle. As appreciated, the mask 50 includes labels to a captured image and the occupancy grid 60 includes real world correlation to the objects and features identified in the images. The mask 50 that is projected onto the occupancy grid 60 will include at least the best line 52 and the open space identifications. The other labels, such as or the vehicles 44 may also be projected onto the occupancy grid 60. The occupancy grid 60 may be implemented as a two-dimensional grid or a three-dimensional grid. The mask 50 will be altered to fit either a two-dimensional grid or a three-dimensional grid.

Once the mask 50 is projected onto the occupancy grid 60, a candidate parking space 62 is identified and a centerline 64 is defined in that spot for use by the autonomous driving system 26. The autonomous driving system 26 uses this information to define a path for the vehicle into the space 62.

Figure 6:
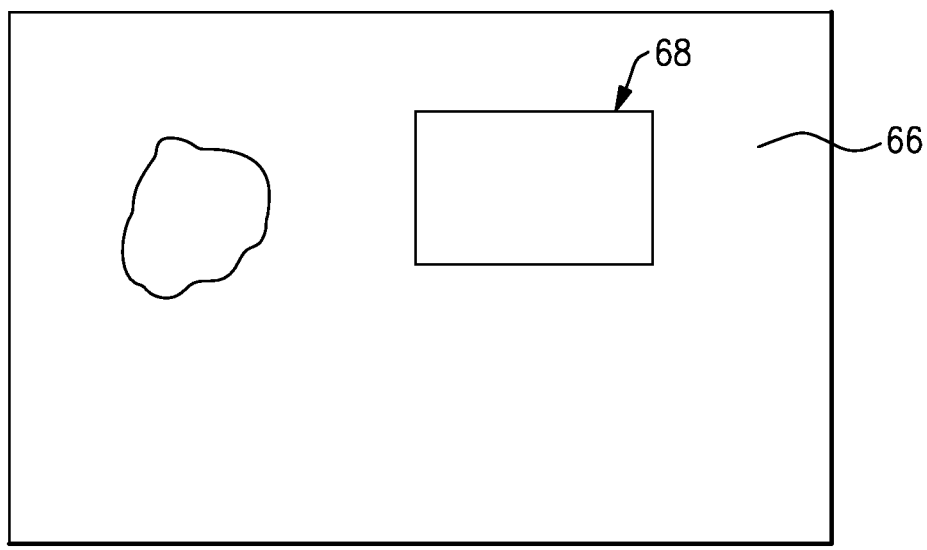
FIG. 6 is a schematic view of a selected area within an open area without marking markers.

Referring to FIG. 6, the disclosed method and system is also operable in areas where no parking markers or other vehicles are present. FIG. 6 is a schematic view of an open area that may be adjacent to a campground or any other area where parking markers are not utilized. In this case, the user will be alerted to place box 68 on the captured image of an open area 66 that is void of any objects that define parking spaces. The box 68 provides the definition of the parking space that comprise the mask. As appreciated, although a box 68 is shown by way of example, any shape or area selection feature may be utilized within the contemplation of this disclosure. Accordingly, rather than have the neural network 34 use objects within the image to determine a suitable parking space, the operator defines the space for parking. The defined space indicated by the box 68 is then projected onto the occupancy grid and utilized to generate a path to move the vehicle 20 into that space.

Accordingly, the disclosed example parking space detection system 28 utilizes semantic segmentation to detect fee space and vehicles from images captured with cameras 24, 40 on the vehicle 20. Features and objects within the images are labeled an edge of vehicles and parking markers are identified. The edges of the vehicles and parking markers are used to define a best horizontal line 52. The images including the labels of open spaces and the best line 52 are projected onto an occupancy grid to orientate the open spaces relative to the vehicle 20 and identify available open parking spaces.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An automated vehicle parking system for a motor vehicle comprising:
    at least one camera obtaining images proximate a vehicle;
    at least one sensor array detecting objects proximate the vehicle; and
    a controller configured to generate a mask of an area proximate the vehicle from the images obtained by the at least one camera including labeled features identified within the obtained images and project the generated mask onto an occupancy grid generated with information from the at least one sensor array, wherein the controller is configured to locate a parking space responsive to open spaces defined within the generated mask,
    wherein the controller is further configured to detect edges of objects in the generated mask comprising detecting horizontal edges of a parked vehicle within a parking spot and horizontal edges of parking space markers, and the controller is configured to define a best line across defined parking spaces based on the detected horizontal edges of the parked vehicle and the horizontal edges of the parking space markers.

2. The automated vehicle parking system as recited in claim 1, wherein the controller includes a neural network configured to label features within the obtained images and is further configured to detect the edges of objects in the generated mask to define parking space size.

3. The automated vehicle parking system as recited in claim 1, wherein the controller is further configured to determine that the parking space is free in response to detecting one or more free spaces on a side of the best line opposite the vehicle.

4. The automated vehicle parking system as recited in claim 3, wherein the controller is further configured to associate a probability that the parking space is empty and to select the parking space with a predefined probability for parking of the vehicle.

5. The automated vehicle parking system as recited in claim 1, wherein the controller is further configured to determine a size of the parking space after the generated mask is projected onto the occupancy grid using dimensions determined from the occupancy grid.

6. The automated vehicle parking system as recited in claim 5, wherein the controller is further configured to select a center of the parking space that is utilized as a destination point for a path determined for maneuvering the vehicle into the parking space.

7. The automated vehicle parking system as recited in claim 1, wherein the controller is configured to define the parking space based on a selection by a vehicle operator in response to no visible parking markers being within the generated mask.

8. The automated vehicle parking system as recited in claim 1, wherein the controller is further configured to determine that an open space on a same side of the best line as the vehicle is not an open parking space.

9. A method of detecting a parking space for an autonomously operated vehicle, the method comprising:
 obtaining images of an area proximate a vehicle;
 generating a mask of the area proximate the vehicle that includes labeled features identified within the obtained images;
 defining free space within the generated mask as parking spaces for the vehicle;
 projecting the generated mask onto an occupancy grid of the area proximate the vehicle to locate the parking space relative to the vehicle;
 detecting edges of objects in the generated mask comprising detecting horizontal edges of a parked vehicle within a parking spot and horizontal edges of parking space markers; and
 defining a best line across the defined parking spaces based on the detected horizontal edges of the parked vehicle and the horizontal edges of the parking space markers.

10. The method of detecting a parking space as recited in claim 9, wherein detecting the edges of objects in the generated mask defines parking spot size.

11. The method of detecting a parking space as recited in claim 9, further comprising determining that the parking space is free in response to detecting free spaces on a side of the best line opposite the vehicle.

12. The method of detecting a parking space as recited in claim 9, further comprising associating a probability that the parking space is empty and selecting a parking space with a predefined probability for parking of the vehicle.

13. The method of detecting a parking space as recited in claim 9, further comprising determining a size of the parking space after the generated mask is projected onto the occupancy grid using dimensions determined from the occupancy grid.

14. The method of detecting a parking space as recited in claim 13, further comprising selecting a center of the parking space for definition of a path for moving the vehicle into the parking space.

15. The method of detecting a parking space as recited in claim 9, wherein the obtaining of images of an area proximate the vehicle further comprises obtaining images from cameras located on at least one side mirror of the vehicle.

16. The method of detecting a parking space as recited in claim 9, wherein the defining free space within the generated mask further comprises selecting an open area as the parking space in response to no visible parking markers being within the generated mask.

17. The method of detecting a parking space as recited in claim 16, wherein the selecting an open area further comprises prompting a vehicle operator to assign a location within the open area as the parking space.

18. The method as recited in claim 9, further comprising determining that an open space on a same side of the best line as the vehicle is not an open parking space.

* * * * *